Dec. 13, 1955
H. W. KLEIST
2,726,515
SELF-CONTAINED HEAT EXCHANGE PLATES
WITH ELECTRIC RESISTANCE
Filed Oct. 9, 1953
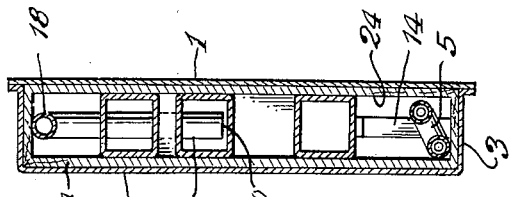
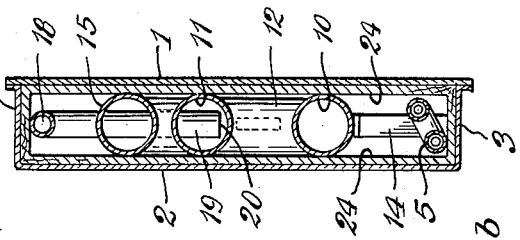
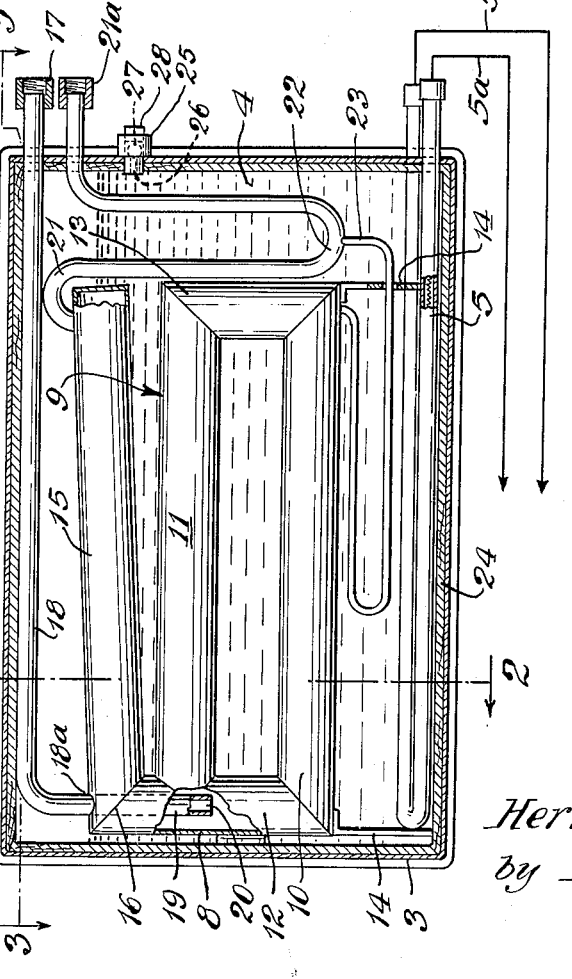
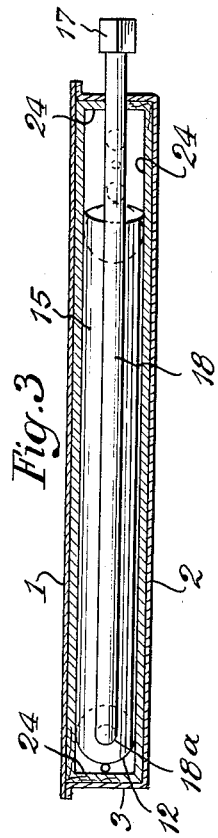
Inventor
Herman W. Kleist
by Parker & Carter
Attorneys United States Patent Office 2,726,515
Patented Dec. 13, 1955

2,726,515
SELF-CONTAINED HEAT EXCHANGE PLATES WITH ELECTRIC RESISTANCE

Herman W. Kleist, Hollywood, Ill., assignor to Dole Refrigerating Company, Chicago, Ill., a corporation of Illinois Application October 9, 1953, Serial No. 385,126

13 Claims. (Cl. 62—126)

My invention relates to an improvement in heat exchange elements for use primarily in connection with refrigeration. It has for one purpose to provide a heat exchange element useful in the defrosting of evaporators cooled by a volatile refrigerant.

Another purpose is to provide a self-contained heat exchange plate which is compact and efficient, and which can be shipped and handled as a unit.

Another purpose is to provide such a plate which can be easily installed and included in a suitable refrigerating system in which a compressor and condenser are included.

Another purpose is to provide such a unit of small bulk and of convenient shape.

Another purpose is to provide a heat exchange unit with improved and self-contained insulating means.

Another purpose is to provide such a unit which includes means for adequately dealing with the problem of oil in the refrigerant.

Another purpose is to provide improved means for heating the heat storage body of such a heat exchange element.

Other purposes will appear from time to time in the course of the specification and claims.

The present application is a continuation-in-part of my copending application Serial No. 373,627, filed in United States Patent Office on August 11, 1953, for "Self-Contained Heat Exchange Plates."

I illustrate the invention more or less diagrammatically in the accompanying drawings, wherein:

Figure 1 is a side elevation, with parts broken away and parts in section;

Figure 2 is a section on the line 2—2 of Figure 1;

Figure 3 is a section on the line 3—3 of Figure 1; and

Figure 4 is a section similar to Figure 2, illustrating a variant formation of one of the coil structure.

Referring to the drawings, I illustrate a plate or casing or housing structure, shown as including two plate side walls 1 and 2, the plate side walls being suitably connected about their edges in gas-tight relationship. I illustrate them as being connected, for example, by circumferential wall portions 3, which may be formed as flanges of one of the side plate walls. It is to be understood, of course, that the outer housing or plate may be formed in a variety of ways, but the structure herein shown is compact, strong and efficient. Within the housing or plate thus formed, I illustrate a body of heat-absorbing or heat-storing material, which, for example, may be a liquid, as indicated at 4 in Figure 1. The plate is shown as set on edge, with the liquid extending substantially up the interior of the plate. I may employ water or alcohol, or any suitable liquid.

In heat exchange relation with the body 4 I have illustrated two separate coils or passage systems through which a volatile refrigerant may be caused to flow. It will be understood that I employ the term "coil" broadly, and do not wish to be restricted thereby to any specific arrangement of tubes or passages, except as I specifically restrict myself in my claims.

I may employ any suitable means for heating the heat exchange body or liquid 4. For example, I may employ a lower coil or tube 5, which, if desired, could be connected to receive a flow of heated fluid. As an example, the coil 5 could be connected to receive the hot gas from the pressure side of the compressor. However, I prefer to employ, as shown herein, an electric resistance element which may be in the tube 5, or may be used without any such tube 5, and which is suitably connected to conductive elements or wires 5a and 5b, which, in turn, may be connected in any suitable electric circuit, for example, any suitable commercial supply of electricity whereby the electric resistance element in heat exchange relation with the body or liquid 4 serves to store heat in such body.

I illustrate, also, an upper coil or passage system 8, which is shown as in the form of a loop 9 formed by a lower coil arm 10, an intermediate coil arm 11, and connecting coil arms 12 and 13. The loop so formed is preferably supported, for example, by any suitable spacers 14, with the lower coil arm 10 immersed in the liquid, but with the intermediate coil arm 11 in part extending above the liquid. 15 indicates an upper coil arm which is shown as connected at one end to the loop, as at 16. Refrigerant to be heated, to vaporize it, is delivered through an inlet fitting 17 to a delivery tube 18 which extends to the upper coil arm as at 18a, and has a downward extension 19 within the connecting coil arm 12. This downward extension 19 has an open lower end 20, which may be conveniently located generally at the level of the top surface of the liquid body 4. 21 indicates a discharge duct or pipe extending from the opposite end of the upper coil arm 15 to a discharge fitting 21a. 22 indicates a downward bend or liquid trap which preferably extends downwardly into the liquid body 4. The lower end of the bend is shown as connected by a duct 23, with the lower coil arm 10. If lubricating oil gathers in the lower arm, it is carried back to the compressor by suction through the duct 23.

I may employ any suitable insulating means for the unit thus provided. I may, for example, use any suitable external insulating jacket. I prefer, under some circumstances, to provide inner layers 24 of a suitable insulating material or board, which are shown as located between the coil structure and the plate side walls 1 and 2. I may employ any suitable material, but have found balsa wood to be advantageous, particularly when treated with asphaltum or with any suitable water repellent. I find it advantageous to draw the plate side walls 1 and 2 inwardly against the insulating layers 24 by the employment of a pressure differential. I illustrate, therefore, a fitting 25 through which air may be suitably exhausted from the interior of the plate or housing. This fitting may include an outlet passage 26 normally closed by a ball or valve 27. Any suitable outside closure 28 may also be provided. It will be understood that when a suitable volume of air has been withdrawn from the interior of the plate, the result will be to provide a substantial pressure differential, with the pressure within the plate somewhat below atmospheric pressure. I thus cause the excess outside pressure to exert a strong inward thrust against the plate side walls 1 and 2, which holds them firmly against the insulating layers 24, which are thereby firmly pressed against the above described coil system.

It will be realized that whereas I have described and shown a practical and operative device, nevertheless many changes may be made in size, shape, number and position of parts without departing from the spirit of my invention. I therefore wish my description and drawings to be taken as in a broad sense illustrative or diagrammatic rather than as limiting me to my specific disclosure herein. For example, as shown in Figure 4, I may employ rectangular tubing in the upper coil system, thus providing a rectangular and plane-surfaced support or abutment for the plate side walls 1 and 2, and for the insulating layers 24 when they are subjected to the above discussed pressure differential. It will, of course, be understood that whereas I prefer to employ an electric resistance to heat the body 4, other suitable heating means may be employed.

The height of the liquid is not critical but I find it preferable that the top arm 15 be located in part or entirely above the level of the liquid.

The use and operation of my invention are as follows:

In automatic refrigeration systems it is common to employ a compressor to deliver a hot refrigerant, in a gaseous state, to a suitable condenser and receiver. The hot gas is condensed in the condenser and gathers in the receiver as a liquid. This liquid may then be delivered to a suitable evaporator, not herein shown, through an expansion valve or capillary, or any other suitable means, for causing a pressure drop. The liquid refrigerant evaporates in the evaporator and returns as a gas to the suction side of the compressor. Such evaporators may be defrosted by by-passing the condenser and delivering hot gas to the evaporator. This hot gas serves to defrost the evaporator, but it, at least partially, liquefies or condenses in the course of the defrosting operation. This liquid refrigerant should then be evaporated before it returns to the suction side of the compressor. The liquid refrigerant, in my structure, is received by the inlet 17 and flows into the coil or boiler, including the elements 10, 11, 12, 13 and 15. Part of the boiler, for example, the elements 10, 11, 12 and 13, are partly or totally in heat exchange relation with the body 4, preferably of liquid. I employ the heat of the body 4 to vaporize the volatile refrigerant. The vaporized refrigerant returns to the suction side of the compressor, along the pipe 21, through the submerged loop 22, and by and past the fitting 21a. The lower pipe or duct 5 I prefer to employ as an enclosure for a suitable resistance. This resistance provides the heat necessary for maintaining the preferably liquid body 4 at a proper temperature to perform the function of evaporating the liquid refrigerant which flows to the "boiler" along the duct 18. It will be understood, of course, that, if desired, I may circulate a heated fluid through the tube or duct 5. Under some circumstances, it may be advantageous to employ my plate or unit in a circuit in which the hot refrigerant itself passes through the pipe 5 and serves as means for heating the heat storage body 4.

One advantage of employing electricity is that it may be employed to provide a continuous or uniform temperature. Also, since the input of heat may be maintained at a constant or substantially constant rate, insulation of the unit may, under some circumstances, be omitted. However, I do prefer to have a minimum of insulation, as, for example, the relatively thin inside layer 24, as shown in the drawings.

I claim:

1. In a heat exchange unit for completing the vaporization of unvaporized refrigerant returned from an evaporator in the course of defrosting, a housing including plate walls sealed together to form a gas-tight container, a body of heat storing material within and partly filling the container, a boiler element extending into said material, said boiler element being in the form of a closed loop having an upper arm extending from one end of said loop and overlying the loop with at least the arm extending above the body of the heat storing material and inlet and outlet connections for the boiler including an outlet duct extending from an end of the arm and an inlet duct extending to the closed loop, and a heating element for heating the heat-storing material said heating element including a tube extending into the heat storage material.

2. In a heat exchange unit for completing the vaporization of unvaporized refrigerant returned from an evaporator in the course of defrosting, a housing including plate walls sealed together to form a gas-tight container, a body of heat storing material within and partly filling the container, a boiler element extending into said material, said boiler element being in the form of a closed loop having an upper arm extending from one end of said loop and overlying the loop with at least the arm extending above the body of the heat storing material and inlet and outlet connections for the boiler including an outlet duct extending from an end of the arm and an inlet duct extending to the closed loop, and a heating element for heating the heat-storing material said heating element including a resistance in heat exchange relation with the heat storage material.

3. In a heat exchange unit for completing the vaporization of unvaporized refrigerant returned from an evaporator in the course of defrosting, a housing including plate walls sealed together to form a gas-tight container, a body of heat storing material within and partly filling the container, a boiler element extending into said material, said boiler element being in the form of a closed loop having an upper arm extending from one end of said loop and overlying the loop with at least the arm extending above the body of the heat storing material and inlet and outlet connections for the boiler including an outlet duct extending from an end of the arm and an inlet duct extending to the closed loop, and a heating element for heating the heat-storing material said heat storing material including a substance which is liquid at all normal operating temperatures.

4. The structure described in claim 3 wherein said boiler element comprises a tubular member of rectangular cross-section.

5. In a heat exchange unit adapted for completing the vaporization of unvaporized refrigerant returned from an evaporator in the course of defrosting, a housing including plate walls sealed together to form a gas-tight container, a body of heat storing liquid within and partly filling the container, a refrigerant vaporizing element extending into said liquid, said element including a tubular component lying generally below the level of the liquid and an upper arm extending therefrom at least partially above the liquid level and overlying said first mentioned component, inlet and outlet connections for said vaporizing element including an outlet duct extending from an end of the arm and an inlet duct extending to the first mentioned component, the outlet duct having an intermediate downward extension into the liquid, and a drain duct extending between a lower portion of said downward extension and said first mentioned component, and means for maintaining said liquid at a predetermined temperature.

6. The structure of claim 5 wherein the means for maintaining said liquid at a predetermined temperature includes an electric resistance for heating the liquid and an actuating circuit therefor.

7. The structure of claim 5 characterized in that the tubular component is in the form of a closed loop, with the upper arm extending from one end of the loop.

8. The structure of claim 5 characterized in that the upper arm inclines downwardly toward its junction with the tubular component.

9. In a heat exchange unit adapted for completing the evaporation of unvaporized refrigerant returned from an evaporator in the course of defrosting, a housing including plate walls sealed together to form a gas-tight container, a body of heat storing liquid within and partly filling the container, a refrigerant vaporizing element extending into said liquid, said element including a tubular component lying generally below the level of the liquid and an upper arm extending therefrom at least partially above the liquid level and overlying said first mentioned component, inlet and outlet connections for said vaporizing element including an outlet duct extending from an end of the arm and an inlet duct extending to the first mentioned component, the outlet duct having an intermediate downward extension into the liquid, and means for maintaining said liquid at a predetermined temperature.

10. The structure described in claim 5, wherein the refrigerant vaporizing element comprises a tubular member of rectangular cross-section.

11. In a heat exchange unit for completing the vaporization of unvaporized refrigerant returned from an evaporator in the course of defrosting, a housing including plate walls sealed together to form a gas-tight container, a body of heat storing material within and partly filling the container, a boiler element extending into said material, said boiler element being in the form of a closed loop having an upper arm extending from one end of said loop and overlying the loop, with at least the arm extending above the body of heat storing material, and inlet and outlet connections for the boiler including an outlet duct extending from an end of the arm and an inlet duct extending to the closed loop, there being a trap bend in said outlet duct.

12. The structure of claim 11, including a drain connection between a lower part of the boiler element and the trap bend.

13. In a heat exchange unit for completing the vaporization of unvaporized refrigerant returned from an evaporator in the course of defrosting, a housing including plate walls sealed together to form a gas-tight container, a body of heat storing material within and partly filling the container, a boiler element extending into said material, said boiler element being in the form of a closed loop having an upper arm extending from one end of said loop and overlying the loop, with at least the arm extending above the body of heat storing material, and inlet and outlet connections for the boiler including an outlet duct extending from an end of the arm and an inlet duct extending to the closed loop, the inlet connection for the boiler element including an open-ended pipe extending downwardly in the boiler element to adjacent the level of the surface of the heat storing material.

References Cited in the file of this patent

UNITED STATES PATENTS

| Number | Name | Date |
|---|---|---|
| 1,794,110 | Gay | Feb. 24, 1931 |
| 2,410,194 | Baker | Oct. 29, 1946 |
| 2,487,674 | Rott | Nov. 8, 1949 |